United States Patent
Nagaoka et al.

(10) Patent No.: US 7,470,382 B2
(45) Date of Patent: *Dec. 30, 2008

(54) METHOD FOR DETERMINING A PRODUCTION PARAMETER OF AN INJECTION MOLDING, METHOD FOR PRODUCING AN INJECTION MOLDING, INJECTION MOLDING DEVICE AND PROGRAM

(75) Inventors: Shinichi Nagaoka, Ichihara (JP); Tomoo Hirota, Ichihara (JP); Yoshiaki Togawa, Kyoto (JP)

(73) Assignee: Sumitomo Chemical Company, Limited, Osaka (JP)

( * ) Notice: Subject to any disclaimer, the term of this patent is extended or adjusted under 35 U.S.C. 154(b) by 583 days.

This patent is subject to a terminal disclaimer.

(21) Appl. No.: 10/812,053

(22) Filed: Mar. 30, 2004

(65) Prior Publication Data

US 2005/0046060 A1  Mar. 3, 2005

(30) Foreign Application Priority Data

Mar. 31, 2003  (JP)  ............................ P2003-094454
Mar. 31, 2003  (JP)  ............................ P2003-094455
May 29, 2003  (JP)  ............................ P2003-152054

(51) Int. Cl.
*B29C 45/27* (2006.01)
*B29C 45/76* (2006.01)

(52) U.S. Cl. ...................... 264/40.1; 425/145; 425/163; 700/98; 700/200

(58) Field of Classification Search ................ 264/40.1, 264/40.7, 219; 425/145, 163; 700/200, 98, 700/118, 182, 197

See application file for complete search history.

(56) References Cited

U.S. PATENT DOCUMENTS

| | | | | |
|---|---|---|---|---|
| 5,812,402 A | * | 9/1998 | Nishiyama et al. | ............. 700/97 |
| 6,096,088 A | * | 8/2000 | Yu et al. | ......................... 703/9 |
| 6,454,973 B1 | * | 9/2002 | Norton | ....................... 264/40.1 |
| 6,558,605 B1 | * | 5/2003 | Wilson | ..................... 264/328.8 |
| 6,816,820 B1 | * | 11/2004 | Friedl et al. | ..................... 703/2 |

(Continued)

FOREIGN PATENT DOCUMENTS

JP  08-118420 A  5/1996
JP  2001-277308 A  10/2001

(Continued)

OTHER PUBLICATIONS

Nagaoka et al., "Application of CAO Technique to Injection Molding Analysis", V-212, Jun. 13, 2003, with English Abstract.

(Continued)

*Primary Examiner*—Jill L Heitbrink
(74) *Attorney, Agent, or Firm*—Sughrue Mion, PLLC

(57) ABSTRACT

An object of the present invention is to achieve favorable injection molding with reduced mold clamping force required for molding and with suppression of weld line occurrence without repeating trial and error manually, by prompt calculation of adequate production parameters, when conducting injection molding of resin products. When the injection molding is conducted using a mold having a plurality of resin inflow conduits N, R, G1, G2, and G3 to the cavity CV, the combination of a numerical analysis method for calculating the injection molding process and a computer-aided optimization method, derives the production parameters which determine time-sequentially the inflow of resin material through resin inflow conduits.

9 Claims, 13 Drawing Sheets

U.S. PATENT DOCUMENTS

2003/0149498 A1* 8/2003 Rebello et al. ................ 700/97
2004/0047935 A1* 3/2004 Moss et al. ................ 425/145

FOREIGN PATENT DOCUMENTS

| JP | 2002-355866 A | 12/2002 |
|----|---------------|---------|
| WO | WO 02/100623 A1 | 12/2002 |

OTHER PUBLICATIONS

Nagaoka et al., "Application of CAO Technique to Injection Molding Analysis", C217, Nov. 4, 2003, with English Abstract.

Nagaoka et al., "New Method of Designing Runner System for Injection Mold Using CAO Technique", ANTEC 2004.

* cited by examiner

GATE OPERATION (CASE1)

GATE OPERATION (CASE 2)

METHOD FOR DETERMINING A PRODUCTION PARAMETER OF AN INJECTION MOLDING, METHOD FOR PRODUCING AN INJECTION MOLDING, INJECTION MOLDING DEVICE AND PROGRAM

BACKGROUND OF THE INVENTION

1. Field of the Invention

The present invention relates to a method for determining a production parameter in the case of injection molding of resin, a method for producing an injection molding using the production parameter, an injection molding device, and a program.

2. Related Background Art

When molding resin with an injection molding device, there is a demand to minimize the mold clamping force necessary for molding. Normally, the mold clamping force of a device is predetermined by using a safety factor allowance as well as the mold clamping force required for molding, therefore the smaller the required mold clamping force for molding, the less the output of the pressure generating system in a injection molding device is required. Accordingly, if the device can be substituted for a smaller one, the running cost decreases, and this is the reason why there is such a demand to minimize mold clamping force. Furthermore, even in the case of the identical device, the smaller the mold clamping force required, the more gives the higher advantages such as electric power saving and protection of molds are obtained due to the reduced predetermined mold clamping force.

As the mold clamping force is expressed by [(the resin pressure in the cavity)×(the projected area)], reduction of the minimum mold clamping force required for molding (the maximum mold clamping force) is achieved by controlling either or both of these factors. The resin pressure in the cavity varies with parameters of fluidity of the resin to be used, inflow speed, temperature, pressure loss along the injection conduit including a runner, and so on. For stable molding of a resin product, however, an optimum range is predetermined for the respective parameters, and these parameters should be adjusted within the respective limited ranges. On the other hand, the projected area is determined necessarily in principle, once the shape of a resin product is fixed. Nevertheless, the projected area can be substantially decreased subject to the shape of the resin product.

For example, Japanese Patent Laid-open Gazette No. 2002-355866, page 2 discloses, in the case where the product shape extends in a longitudinal direction, that a plurality of gates through which molten resin is injected into the cavity are arranged along the direction from the resin filling starting side to the filling completion side, and the molten resin is sequentially injected into the cavity at a specified interval starting with the injection at the filling starting gate, thus the resin injected in early stage comes to an almost cooled and solidified state when reached the final filling stage, whereby the substantial projected area which should be filled with the molten resin injected from the last gate is significantly reduced compared with the total projected area of the cavity.

In injection molding it is necessary to provide a plurality of gates depending on the dimensions and shape of the product. In use of a plurality of gates, weld will occur at a merging section of the molten resin injected from individual gates. In the weld line occurrence section, the product may suffer from determination of appearance and decrease in strength depending on the condition of merging of the molten resin. Accordingly, it is requested to shift the weld line to a position raising as few problems as possible regarding with appearance and strength.

For example, Japanese Patent Laid-open Gazette No. Heisei 8-118420, pages 2 to 3 describes the prevention of weld line occurrence by injecting a softened resin material from the second gate into the cavity at almost the same time or after the resin injected from the first gate passes over the second gate. Japanese Patent Laid-open Gazette No. 2001-277308, pages 7 to 9 discloses a technology to predict the location of weld lines generated in a molding through flow simulation of a molding process by dividing the shape of the molding into fine elements, further by adjusting the open or close of valve gates on the basis of thus predicted weld lines to shift the weld lines to a preferable corrected location.

SUMMARY OF THE INVENTION

According to the technology disclosed on the aforementioned Japanese Patent Laid-open Gazette No. 2002-355866, page 2, it is difficult to apply the technology to products having general shapes, though a longitudinally extending shape molding allows easy judgment on timing determination of injection time-intervals. This is because in the case of the general shapes it is very difficult to predict how much time lag in injection timing will be sufficient to produce a desired effect. Therefore, it is necessary to repeat trial and error manually trusting intuition or experience to judge the timing of injection start, reduction of inflow or injection stop from a gate.

The method disclosed on the aforementioned Japanese Patent Laid-open Gazette No. Heisei 8-118420, pages 2 to 3 requires repetition of trial and error manually trusting intuition or experience to judge the timing of injection start, reduction of an injection flow rate, or stop of injection from a gate. In the method described in pages 7 to 9 of the Japanese Patent Laid-open Gazette No. 2001-277308, the entire location of the weld lines is not controlled, but a correction value is calculated at only one specific point on a weld line. Consequently, it is difficult to control a complexly-shaped weld line where the resin flows from three directions merge.

The present invention, in view of the foregoing problems, has an object to provide a method for determining a production parameter of an injection molding through prompt calculation of an adequate production parameter without repeating manual trial and error, which can optimize injection molding including reduction of the mold clamping force required for molding and suppression of weld line occurrence, to provide a production method of an injection molding, to provide an injection molding device, and to provide a program therefor.

The present invention has been completed to attain the aforementioned object, and provides a method for determining a production parameter of an injection molding, in implementation of injection molding using a mold having a plurality of resin inflow conduits to a cavity, wherein said production parameter determines time-sequentially an inflow of resin material from resin inflow conduits into said cavity by combination of a numerical analysis method for calculating injection molding process and a computer-aided optimization method.

The present invention is highly effective, for example, in controlling the mold clamping force required for injection molding.

That is, through obtaining of a production parameter which determines time-sequentially the inflow of resin material from resin inflow conduits using the combination of the numerical analysis method for calculating the injection molding process and the computer-aided optimization method, prompt and accurate calculation of parameter is attained without repeating trial and error manually, thus the control of the maximum mold clamping force generated during the injection molding process is practically performed. Injection molding referred to herein refers to a wide and general injection molding, including, for example, injection-press molding, injection-compression molding, and foam-injection molding.

A preferable production parameter is a parameter to control the action of inflow regulation valves positioned in resin-inflow conduits. A parameter relating to other flow rate regulation means, such as means to regulate the total resin inflow to the mold, may be used independently or may be used together with the parameter for controlling the regulation valves. Various kinds of resin are applicable as the resin material for molding depending on the target products and production conditions, and thermoplastic resin is preferred. For the case of thermoplastic resin, flow rate regulation can be done smoothly when adopting a hot runner having a heat-retaining means in the resin inflow conduit. The inflow regulation valve may be configured as what is called the valve gate.

The control method of the action of an inflow regulation valve may be variable flow rate control. In practical application, however, the control of either full opening or full closing is sufficient. As a practical constraint condition, it is preferable to optimize the production parameter under the condition that at least one valve gate is opened at any spot of time during the filling stage. For efficient work for optimization, if a valve gate is disposed at each of the plurality of resin-inflow conduits, one valve gate may be selected as a timing regulation gate, while action of the other valve gates are arbitrarily arranged, and the timing regulation gate may be controlled so that at least one valve gate is opened at any spot of time during filling stage.

In this invention, one or more additives which are usually used may be added to the resin component provided that it does not interfere with the purpose of the invention. The additives include fibrous reinforcing materials such as glass fiber, silica alumina fiber, alumina fiber, carbon fiber, organic fiber derived from such plants as hemp and kenaf, and synthetic fiber; acicular reinforcing materials such as aluminum borate whisker and potassium titanate whisker; inorganic fillers such as glass beads, talc, mica, graphite, wollastonite and dolomite; mold-release enhancers such as fluororesins and metal soaps; coloring agents such as dyes and pigments; antioxidants; heat stabilizers; ultraviolet light absorbers; anti-static agents; and surfactants. The thermoplastic resin available in this invention may be any of those substances generally referred to as thermoplastic resins, e.g., amorphous polymers, semi-crystalline polymers, crystalline polymers and liquid crystal polymers. The thermoplastic resin may be of one type, or a blend of plural polymer components.

Specifically, the thermoplastic resin may be an olefin resin such as low density polyethylene, high density polyethylene, propylene resin and ethylene propylene copolymer; styrene resin such as polystyrene, high impact polystyrene and ABS resin; an acrylic resin such as polymethyl methacrylate; polyester resin such as polyethylene terephthalate and polybutylene terephthalate; polycarbonate resin such as polycarbonate and modified polycarbonate; polyamide resin such as polyamide 66, polyamide 6 and polyamide 46; polyacetal resin such as polyoxymethylene copolymer and polyoxymethylene homopolymer; engineering plastics and super engineering plastics such as polyether sulfone, polyether imide, thermoplastic polyimide, polyether ketone, polyether ether ketone and polyphenylene sulfide; cellulose derivatives such as cellulose acetate, cellulose acetate butyrate and ethyl cellulose; liquid crystal type polymer such as liquid crystal polymer and liquid crystal aromatic polyester; and thermoplastic elastomer such as thermoplastic polyurethane elastomer, thermoplastic styrene butadiene elastomer, thermoplastic polyolefin elastomer, thermoplastic polyester elastomer, thermoplastic vinyl chloride elastomer and thermoplastic polyamide elastomer.

Another suitable resin material is, for example, a low flow polypropylene resin used in automotive parts. The fluidity of the resin is expressed by Melt Flow Rate (MFR, unit: g/10 min) measured by the method described in JIS-K7210. In the context of this application, a low flow resin is a resin which, when measured by the aforesaid method at a temperature of 230° C. and under a load of 2.16 kg, has a value of 0.5-20, preferably 1.0-10. Among common polypropylene thermoplastic resins, materials having excellent impact strength tend to have a low fluidity when melted, and to improve product impact resistance, a resin having the lowest possible fluidity is preferably selected. As for resins having a MFR value of less than 0.5, the fluidity is too low and molding by the injection molding technique is considered impractical. On the other hand, if the MFR value exceeds 20, it is unlikely that the mold clamping force required for molding will be excessive.

When above-described low flow resin is molded under the conditions for high flow resin, the required mold clamping force becomes enormous, exceeding the capacity of mold clamping force of the molding device, or the device cost and the running cost increase. The method according to the present invention, however, can decrease the mold clamping force required even for such resin. Therefore, the molding device with smaller mold clamping force can be used for molding, or the energy cost or other costs for molding can be reduced.

Preferred resin material also includes polypropylene-base thermoplastic resin. Examples of the polypropylene-base thermoplastic resin are homo-polypropylene, a block copolymer or a random copolymer of polypropylene with other olefin, or a mixture thereof.

The present invention is highly effective also for the case of controlling weld line occurrence.

That is, by determining the production parameter which sets the inflow of resin material time-sequentially from the resin inflow conduits by using the combination of the numerical analysis method for calculating the injection molding process and the computer-aided optimization method, prompt and accurate calculation of parameter is attained without repeating manual trial and error, thus the weld line occurrence in the injection molding is suppressed or controlled. Injection molding referred to herein signifies a wide and general injection molding, including for example, injection-press molding, injection-compression molding, and foam-injection molding.

For determining the above-described production parameter, the state of weld line occurrence in a specified area of the molding may be evaluated. By this evaluation, control of the state of weld line occurrence more suitable for the intended purpose of the product can be implemented. For example, the target area for controlling the weld line occurrence is divided into a plurality of areas, the quantity of weld line occurrence in each area is weighted, and thus weighted quantities of weld line occurrence in those areas are summed to obtain a weld line evaluation value, which is used to lead the weld line occurrence to a specified area or to avoid the weld line occurrence from a specified area. When determining the production parameter, an auxiliary object such as reduction of the required mold clamping force may be adopted in addition to the control of weld line occurrence. The specified area may be a plurality of areas dispersed from each other. Individual areas may have the respective priority orders by weighting the tolerance of weld line occurrence in different areas, which allows further fine controlling.

Another aspect of the present invention is a method for producing an injection molding, comprising the steps of: in an event of conducting injection molding using a mold having a plurality of resin inflow conduits to a cavity, obtaining a production parameter which determines time-sequentially a flow rate of resin material from said resin inflow conduits into said cavity by combination of a numerical analysis method for calculating injection molding process and a computer-aided optimization method; and conducting injection molding while controlling time-sequentially said inflow of resin material from said resin inflow conduits on the basis of the thus determined production parameter.

A further aspect of the present invention is an injection molding device comprising: a molding device main body which feeds resin material to a mold having a plurality of resin inflow conduits to a cavity though the resin inflow conduits; a memory section which memorizes production parameters determined by combination of a numerical analysis method for calculating injection molding process and a computer-aided optimization method; and a control section which carries out injection molding while controlling said molding device main body on the basis of production parameters thus determined and controlling time-sequentially said inflow of said resin material from said resin inflow conduits. The above-described production method of the injection molding and the injection molding device of the present invention include cases of controlling time-sequentially the inflow of resin material from the resin inflow conduits using the above-described production parameter, and cases of processing (correcting) the production parameter depending on the device characteristics, and then controlling time-sequentially the inflow of resin material from the resin inflow conduits by use of thus processed (corrected) production parameter.

Still another aspect of the present invention is a program for making a computer execute, in the course of carrying out injection molding using a mold having a plurality of resin inflow conduits to a cavity, a process of determining production parameters which determines time-sequentially said inflow of said resin material from said resin inflow conduits into said cavity by combination of a numerical analysis method for calculating injection molding process and a computer-aided optimization method.

DESCRIPTION OF THE PREFERRED EMBODIMENTS

Figure 1:
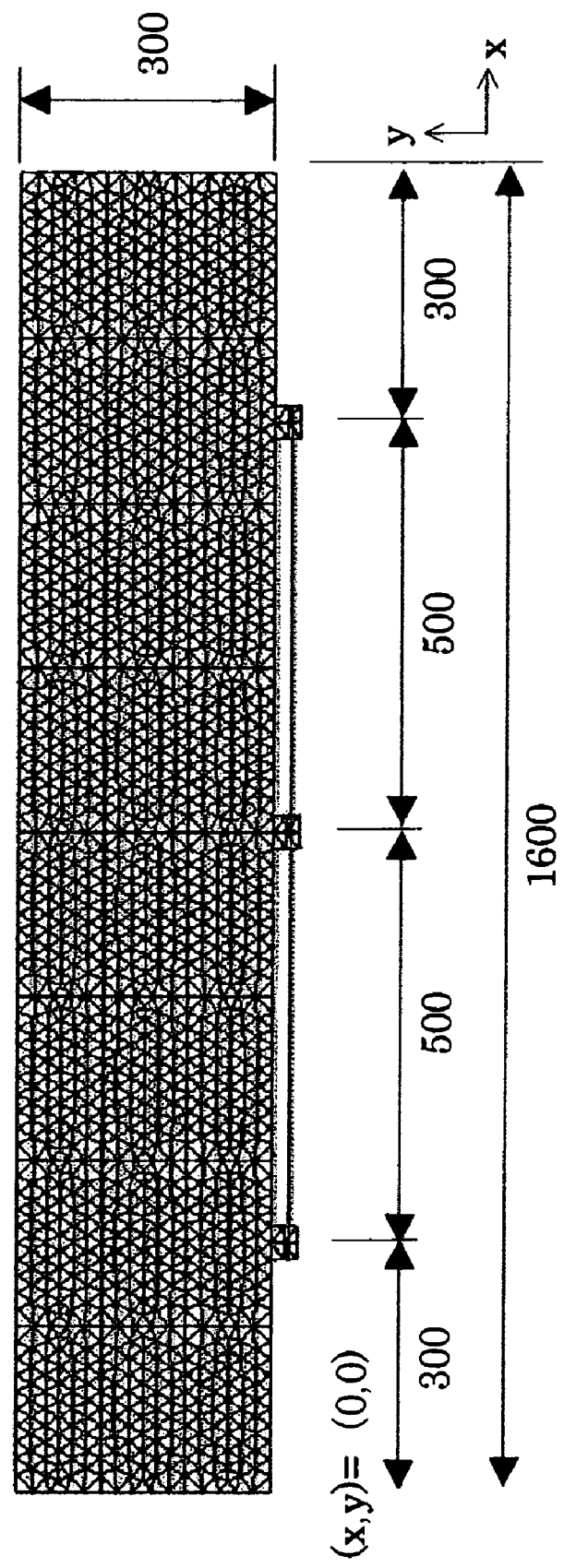
FIG. 1 shows a molding cavity and the location of gates to explain one embodiment according to the present invention.
Figure 2:
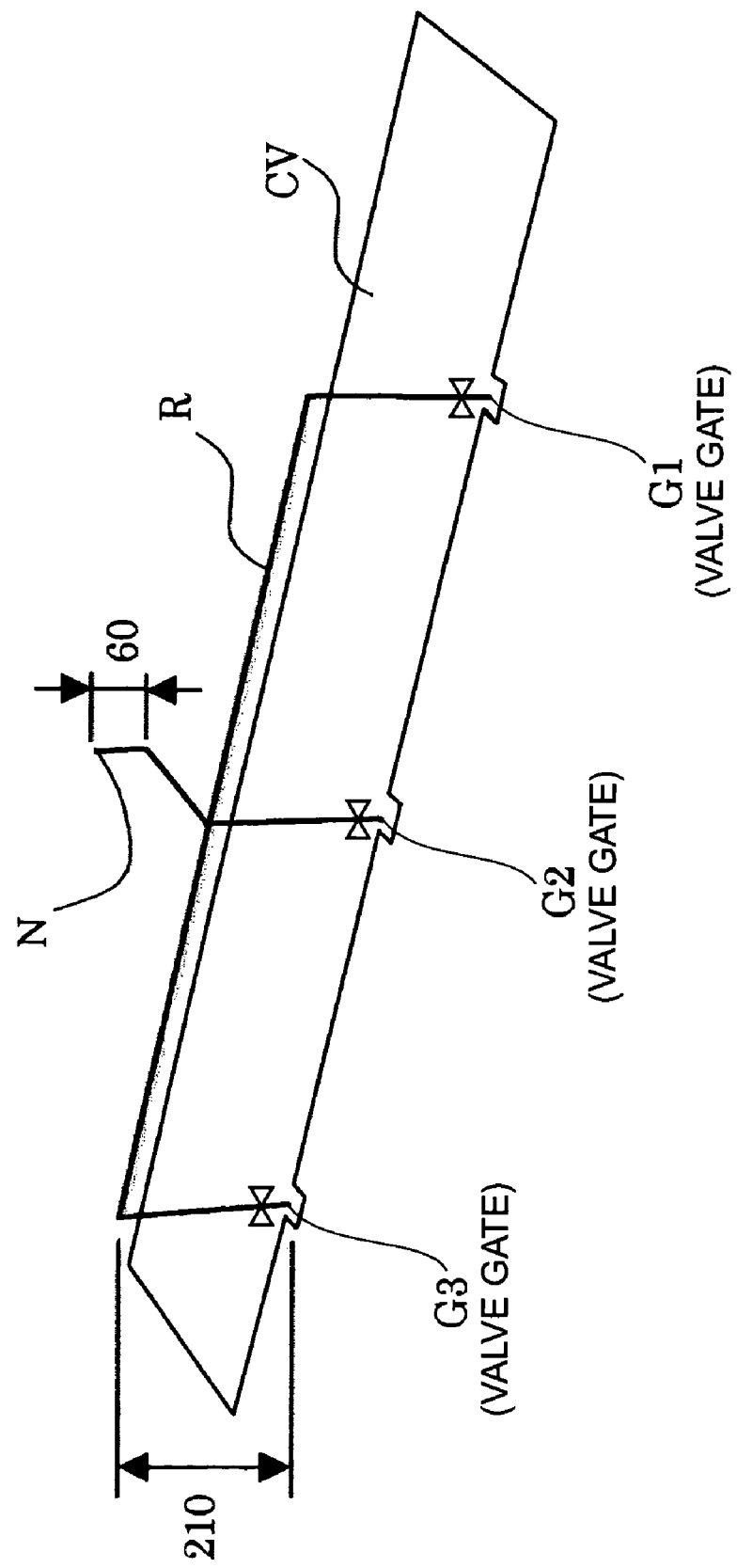
FIG. 2 shows a molding cavity and a resin inflow conduit for molding to explain one embodiment according to the present invention.

A first and second embodiments of the present invention will be described in detail below referring to drawings. These embodiments deal with a case of manufacturing a plate-shaped member extending in one direction (a length-to-width ratio=3/16), as shown in FIG. 1, by injection molding using predetermined resin material. As depicted in FIG. 2, a cavity CV has three gates (G1, G2, and G3) at the center, the right, and the left on one side of the plate. According to the present invention, the number of gates is required only to be two or more and may be adequately determined depending on the shape and dimensions of a resin product.

The first embodiment of the present invention has such a configuration that at least one gate is a valve gate which can be opened and closed by the valve movement, and injection molding is conducted so that the mold clamping force is minimized through the adjustment of the value gate opening degree. The second embodiment of the present invention, which is described later, has such a configuration that at least one gate is a valve gate which can be opened and closed by the valve movement, and injection molding is conducted so that weld lines are located at desired positions through the adjustment of the value gate opening degree. These embodiments are configured in such a manner that all the three gates are valve gates as shown in FIG. 2. However, if at least one of the gates is determined to be kept fully opened or fully closed as the result of the optimization described later, there is no necessity for it to be a value gate in an actual mold. Each gate connects with the front end of a nozzle N via a runner R. The runner R is designed to be a so-called hot runner which is controlled to maintain a specified temperature to prevent the resin in the runner R from solidification.

Figure 13:
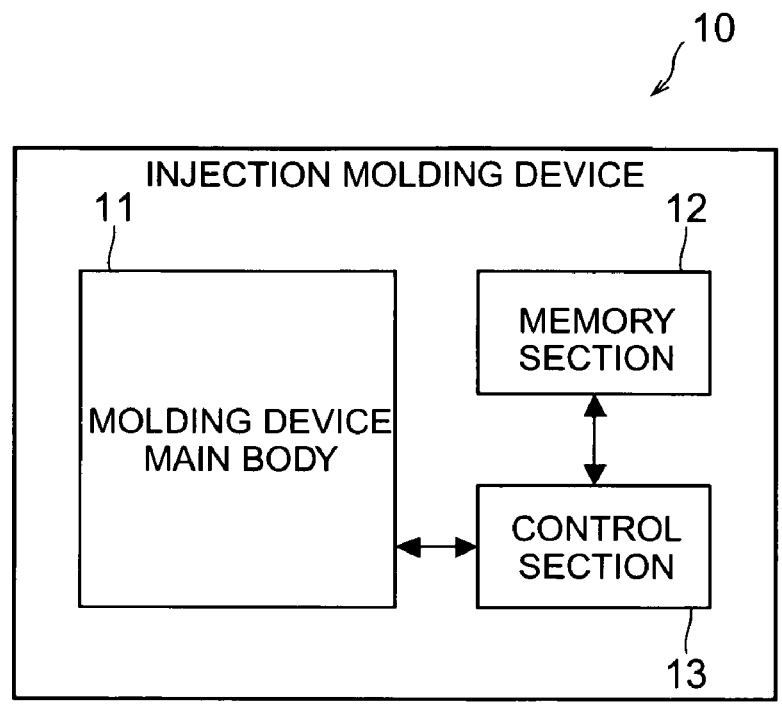
FIG. 13 shows one example of the configuration of an injection molding device according to the present invention.

FIG. 13 shows an example of the configuration of an injection molding device according to the first and second embodiments. As shown in FIG. 13, the injection molding device 10 comprises: a molding device main body 11 which feeds molten resin from the nozzle N shown in FIG. 2; a memory section 12 which memorizes production parameters determined by the combination of the numerical analysis method for calculating the injection molding process and the computer-aided optimization method; and a control section 13 which conducts injection molding while controlling the molding device main body 11 on the basis of the thus determined production parameters and controlling time-sequentially the inflow of the molten resin from the plurality of gates G1 to G3 given in FIG. 2.

[First Embodiment]

Figure 3:
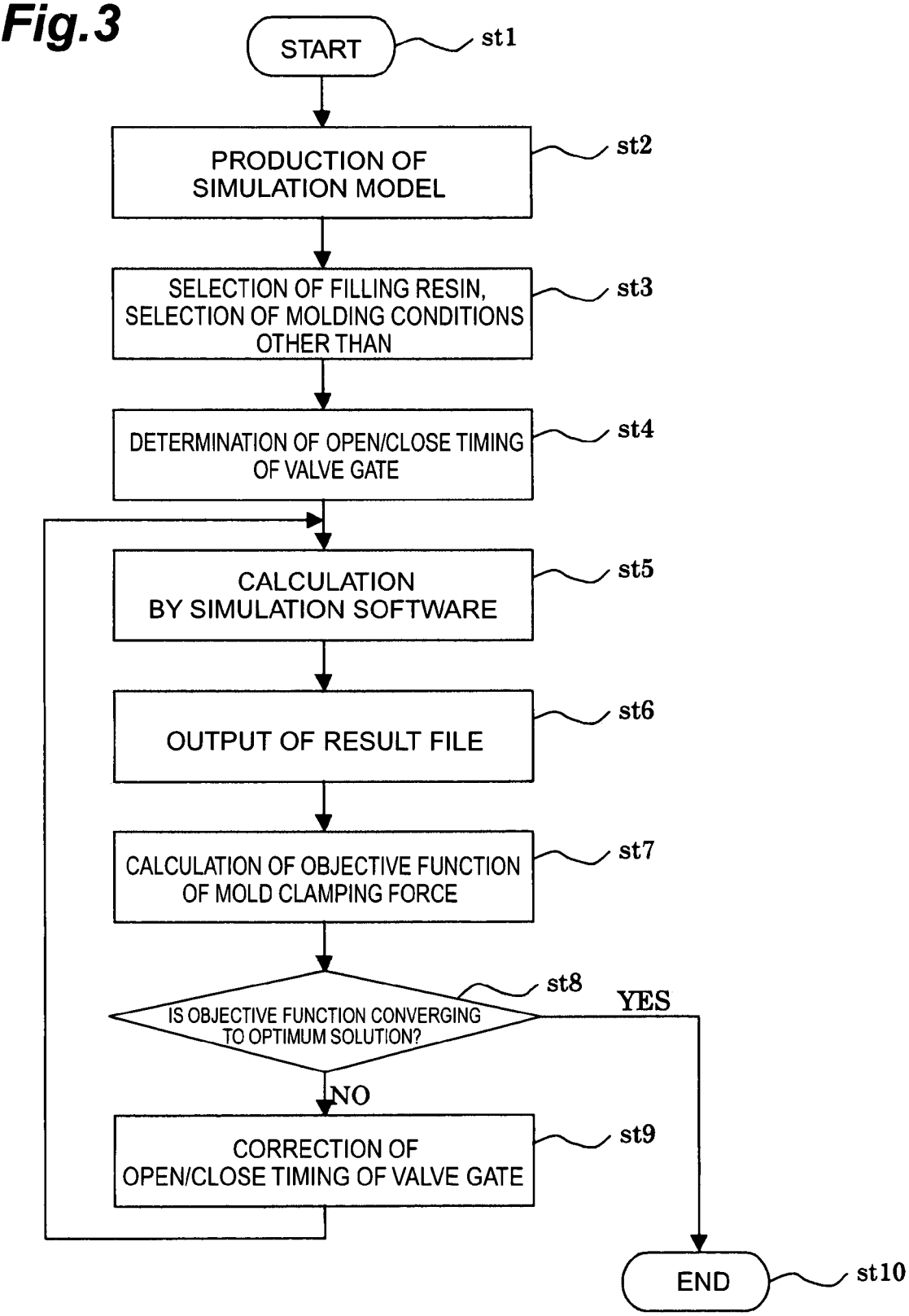
FIG. 3 shows a flow diagram to explain one embodiment of the method for determining a production parameter of an injection molding according to the present invention.

According to the first embodiment, the timing for opening and closing the individual valve gate is determined to minimize the maximum mold clamping force by the combination of the numerical analysis method for calculating the injection molding process and the computer-aided optimization method. Regarding the numerical analysis method for calculating the injection molding process, the method in which the behavior of resin is analyzed based on the finite element method using calculation equations on the basis of the relationship working between elements during molding, has been brought into practical application in recent years. The first embodiment adopts Moldflow Plastics Insight 2.0 rev1 (trade name, produced by Moldflow Corporation). Many similar computer-aided optimization methods have been developed. The first embodiment adopts iSIGHT 6.0 (trade name, produced by Engineous Software Inc.) as software. Since the analysis deals with a problem with intense nonlinearity, SA (simulated annealing) was adopted, which could explore the design space in global basis and was appreciated, therefore, as an easy-attainable global optimum, without a risk of ending in local optimum. The total flow scheme of the analysis is described below referring to the flow diagram of FIG. 3.

(1) Preparation of Simulation Model

Firstly, in Step 2, the simulation model for analyzing the resin flow during the injection molding process is produced. In the embodiment, a wide and flat plate model specified below is used.

Dimensions: 1600 mm in width, 300 mm in length, and 3 mm in thickness

Number of elements: 2862, Number of nodes: 1558, Three gates on one side

Runner diameter: 6 mmφ (Hot runner)

Gate: 4 mmφ×7.5 mm L (Valve gate)

(2) Determination of Molding Condition

In Step 3, the conditions for injection molding are determined. It is necessary to first enter data such as physical properties of the resin selected as the material. The resin applied here are, polypropylene-base resin Sumitomo Noblen NP156 (trade name, produced by Sumitomo Chemical Co. Ltd., same in the following), Sumitomo Noblen AH561, and Sumitomo Noblen AZ564, as listed in Table 1. In Table 1, MFR stands for a melt flow rate (unit: g/10 min), which is an index expressing the resin fluidity measured under the condition of 230° C. temperature with 2.16 kg of load as specified in JIS-K7210. Sumitomo Noblen AH561 is given as an example of low flow resin. The physical properties to be entered include thermal conductivity, specific heat, no-flow temperature, and viscosity, for example.

TABLE 1

| Material | Filler | Fluidity |
| --- | --- | --- |
| NP156 (MFR = 3) | Staple fiber GFPP, GF 30 wt % | Low |
| AZ564 (MFR = 30) | — | High |
| AH561 (MFR = 3) | — | Low |

For other molding conditions, resin temperature, hot runner temperature, and mold temperature were set to 200-240° C., 200-240° C., and 50° C., respectively, the injection speed was set constant, and the injection time was set about 6 to 8 seconds.

(3) Computer-Aided Optimization Stage

The stages of Step 4 and onwards are the computer-aided optimizing stages. That is, in Step 4, the initial value of the required parameter (the open/close timing of the valve gate in this case) is defined, which is called the design variable. In Step 5, the resin inflow process is calculated. In Step 6, the result file is output. In Step 7, the mold clamping force as the objective function is calculated based on the result file. In Step 8, whether the calculated value is converging to an optimum solution, is evaluated. If not, in Step 9 the design variable is corrected based on the algorithm of the optimization method and Step 5 through Step 9 are repeated. If Step 8 determines that the objective function converges to the optimum solution, the optimization stage is completed.

Simulated annealing is adopted in the embodiment as the algorithm of the optimization method. In metal annealing, slow cooling of metals settles the individual molecules energy in a high level to a low level. The simulated annealing adopts this as a model. That is, the simulated annealing is not a method to explore the optimum solution quickly but a method allowing global exploration by generating a variety of solutions while allowing local degradation of solution. The convergence to the optimum solution is to be judged after specified iterations of calculations.

(4) Constraint Condition Impartation on Determining Open/Close Timing

This embodiment adopts three valve gates. The open/close timing may be assumed to establish independently for each individual valve gate. In some cases, however, these valve gates cannot be manipulated independently because of the limitations in actual operation. It is efficient to conduct the optimization under further restricted conditions to exclude that type of unnecessary solution in advance. To this point, the following constraint conditions were established.

Firstly, in this embodiment, the opening degree of each valve gate is not regulated continuously or stepwise, but only two positions of open and close are adopted considering the practical applicability. Here, the applicable action patterns of each valve gate during the injection molding process are considered. Since the resin does not solidify in the hot runner, each valve gate can wait in a closed state even after the start of the injection molding, and can begin an opening action at any time afterwards. Also, a valve gate which was opened once to allow resin to pass through can be closed. If, however, a valve gate which was once opened followed by closing is again opened, the resin in the downstream side of the valve gate may solidify, depending on the period of a closed state, and the product may have molding defects such as deterioration in appearance. Consequently, the operation pattern of [open→close→open] is not adopted. As a result, possible operation patterns for a single valve gate are five in all: (1) always open, (2) always close, (3) close→open, (4) open→close, and (5) close→open→close. This variation is defined as a first constraint condition.

On actual molding, when all the gates are simultaneously closed, runners and valve gates should be subjected to abnormally high pressure, and analysis likely induces error owing to the nature of software. For the countermeasures against this in the embodiment, it was defined as a second condition that at least one gate is kept opened at any spot of time during the molding process.

With the combination of the first and second conditions, the following constraint condition for the action of valve gates is derived. That is, two of the three valve gates can be arbitrarily operated within the five patterns of the first condition. However, at the timing that the two valve gates are closed, the third valve gate must be opened. Hereinafter a valve gate which can be arbitrarily manipulated is called an arbitrary control gate, and a gate which is restricted by the action of other gates is called a regulation gate. A method to vary the design variables under conditions where one valve gate is selected as the regulation gate is described below.

(5) Case Selection on Determining Open/Close Timing

For example, among the valve gates A, B, and C, when the valve gates A and B are selected as arbitrary control gates, and the valve gate C is selected as a regulation gate, the process to determine the timing of each valve gate as the variable is described below specifically.

Figure 4:
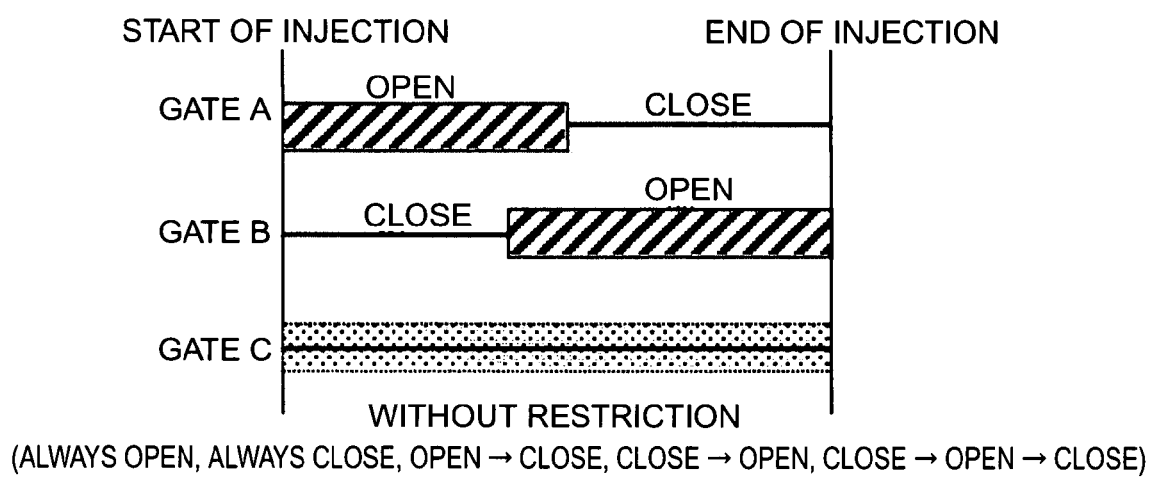
FIG. 4 shows an example of patterns of gate operation in one embodiment of the method for a determining production parameter of an injection molding according to the present invention.
Figure 5:
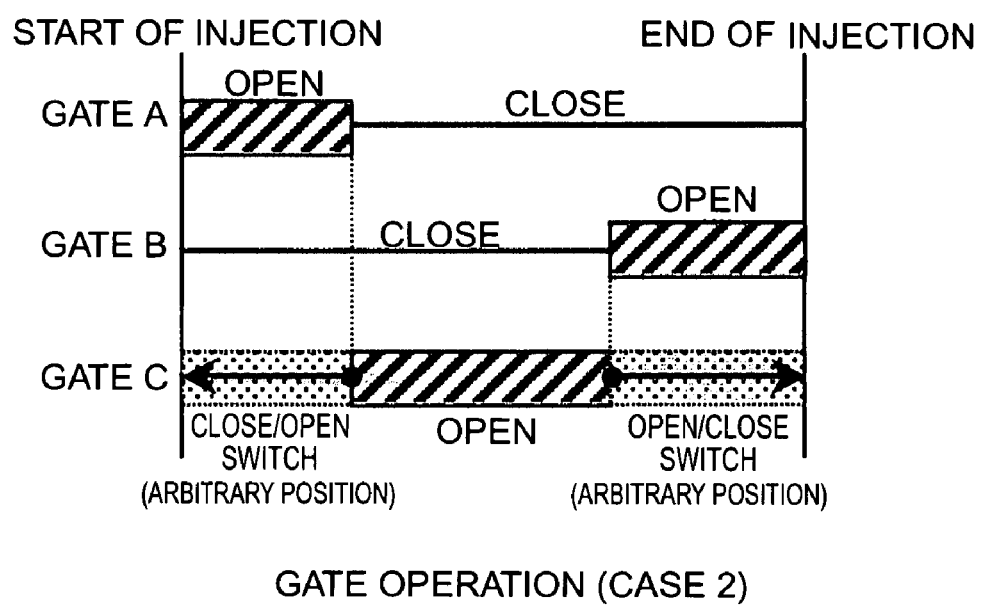
FIG. 5 shows another example of patterns of gate operation in one embodiment of the method for determining a production parameter of an injection molding according to the present invention.
Figure 6:
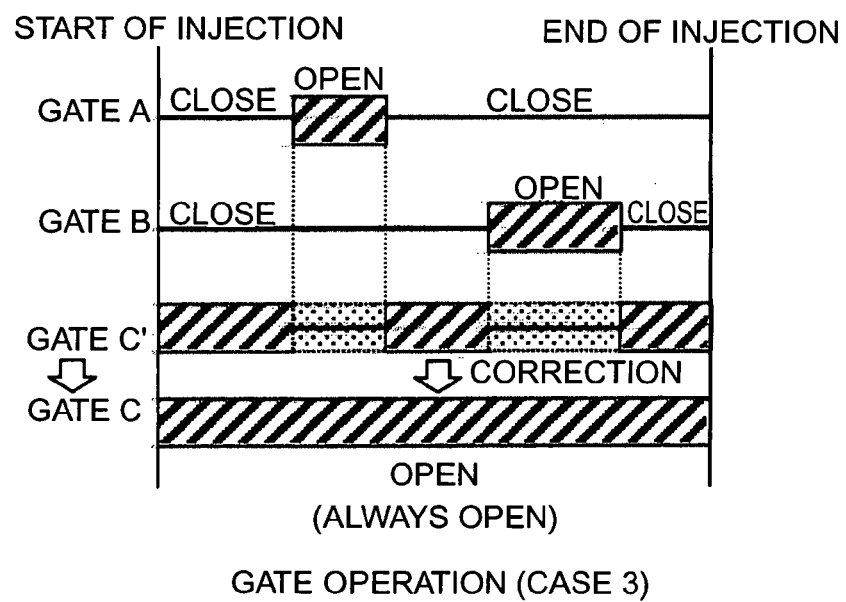
FIG. 6 shows a further example of patterns of gate operation in one embodiment of the method for determining a production parameter of an injection molding according to the present invention.

1) For the arbitrary control gates A and B, the open/close timing is arbitrarily determined under the first condition.
2) Regarding the open/close timing determined for the gates A and B, the open periods of the gates included in the period from the start of injection to the end of the injection are superimposed with each other and the presence of a timing when both gates are closed is judged.
3) If there is not any timing where both gate A and gate B are closed at the same time, the open/close timing for the regulation gate C may be selected arbitrarily without constraint conditions (Refer to the Case 1 of FIG. 4).
4) If there is a timing where both the gate A and gate B are closed at the same time, the gate C is to be kept opened in that particular timing. If there is a plurality of open timings, the close timing sandwiched between the open timings is changed to an open timing to be kept opened so as to satisfy the first condition (not adopting the [open→close→open] pattern). In this case, the open/close timing of the gate C is allowed only to vary in such a manner that the above-described open timing is extended backward or forward (Refer to the Case 2 of FIG. 5). For the Case 3 of FIG. 6, since the gate A and gate B are closed at the same time in the initial stage and the final stage of molding, the gate C must be opened in the initial stage and the final stage of molding. On the other hand, since the first condition does not allow the [open→close→open] pattern, the gate C is always open.

As the conclusion, when the gate C is selected as the regulation gate, the open/close timing of gate A and gate B may be arbitrarily selected under the first condition. Gate C, however, may freely select the open/close timing as in the Case 1, or may be restricted to be kept opened in a specific period as in the Case 2 or to be kept opened in the whole period as in the Case 3. According to this embodiment, in the Step 4 or Step 9, the gate control program determines the above-described case selection, then the optimization support software selects the open/close timing of the valve gates as a variable parameter within the range of the respective constraint conditions, and conducts optimization. Even when one gate is selected as the regulation gate C and failed to judge, similar works conducted by selecting another gate as the regulation gate may increase the analytical accuracy in some cases. The selection of the regulation gate need not be done duplicately for equivalent gates. For example, as shown in FIG. 2, for the case in which the valve gates G1 and G3 are symmetrically positioned to have no difference therebetween in terms of injection molding condition, only one of them may be selected as the regulation gate. Although this embodiment describes an example of the case of three valve gates, the cases of four or more valve gates are similar.

(6) Determination of Open/Close Timing as a Design Variable

With the presumption of case selection described above, methods to determine the open/close timing as design variables are described in more detail. Design variables are determined as follows, and the description is given referring to these.

Open timing of gate A through gate C (in seconds) ... ta1, tb1, tc1

Sustained open time of gates A through gate C (in seconds) ... dta, dtb, dtc

Coefficient of variation of open timing of gate C ... α

Coefficient of variation of close timing of gate C ... β

It should be noted that ta1, tb1, and tc1 are zero at the start of injection.

Figure 7:
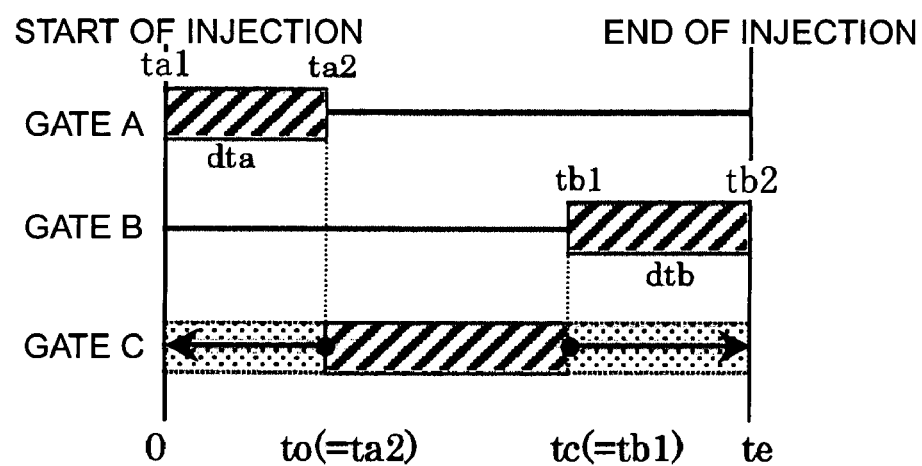
FIG. 7 shows a still another example of patterns of gate operation in one embodiment of the method for determining a production parameter of an injection molding according to the present invention.

Firstly, the gate C is selected as the regulation gate. Then, the gate control program is applied to determine independent variables of open timings ta1 and tb1, and sustained open times dta and dtb for arbitrary control gates A and B, thus conducting the above-described case selection. For the Case 1, the open/close timing of the gate C is also independently determined, therefore all the ta1, tb1, tc1, and dta, dtb, dtc are used as the independent variables. For the Case 2, the critical values of the open/close timing of the gate C, to and tc (the minimum values required to satisfy the constraint condition), are calculated from the values of ta1, tb1, dta, and dtb, as shown in FIG. 7. If the case that the range of open is extended backward and forward is considered, the open and close timings of the gate C, tco and tcc, are determined, respectively, as $$tco = to \times \alpha$$

$$tcc = tc + (te - tc) \times \beta$$

where, te is the time of injection completion. α and β are arbitrary values satisfying $0 \leq \alpha \leq 1$ and $0 \leq \beta \leq 1$, respectively. By varying these values, the open/close timing of the gate C can be arbitrarily changed.

(7) Objective Function

The maximum mold clamping force is calculated as the objective function. The mold clamping force is obtained by multiplying the resin pressure in the cavity calculated using simulation software by the projected area.

(8) EXAMPLE 1

Described is one calculation example where the open/close timing for injection molding of the product shown in FIG. 1 is optimized using the above-described simulation model and method, wherein the molding is conducted by use of a material NP156 given in Table 1. The selected regulation gate is the valve gate G3 in FIG. 2. The molding conditions are resin temperature, hot runner temperature, and mold temperature of 230° C., 230° C., and 50° C., respectively, with the injection time of about 8 seconds. As for the design variables, the initial condition determined in Step 4 and the constraint condition applied in Step 9 are the following.

(1) Constraint Condition $0 \leq ta1 \leq 8$, $0 \leq tb1 \leq 8$, $0 \leq tc1 \leq 8$, $0 \leq dta \leq 8$, $0 \leq dtb \leq 8$, $0 \leq dtc \leq 8$ $0 \leq \alpha \leq 1$, $0 \leq \beta \leq 1$ According to the calculation, the injection time completes in slightly less than about 8 seconds (varied with condition), therefore the upper limit of ta1, tb1, tc1, dta, dtb, dtc is selected as 8 (seconds).

(2) Initial Condition ta1=tb1=tc1=0, dta=8, dtb=dtc=0, α=β=0.5

The results are summarized in Table 2.

TABLE 2

| Condi-tion | (After the start of injection) Gate open timing*¹ [s] | | | Timing regulation gate*² | Injection time [s] | Mold clamping force [ton] |
|---|---|---|---|---|---|---|
| | Gate 1 | Gate 2 | Gate 3 | | | |
| (1) | ○ | X | X | — | 7.8 | 2540 |
| (2) | X | ○ | X | — | 7.5 | 1310 |
| (3) | ○ | X | ○ | — | 7.8 | 1010 |
| (4) | ○ | ○ | ○ | — | 7.5 | 1140 |
| (5) | 5.6-end | 2.4-4.5 | 0-6.2 | Gate 3 | 7.9 | 190 |

Figure 8:
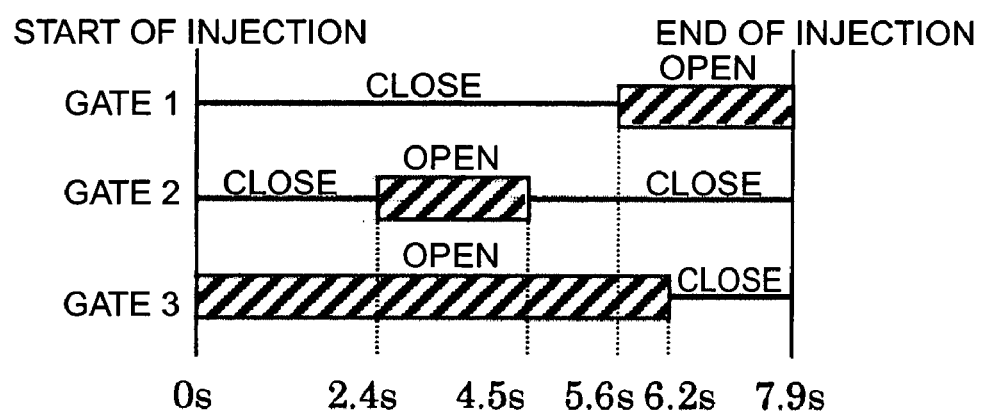
FIG. 8 shows a pattern of gate operation in one embodiment of the method for determining a production parameter of an injection molding according to the present invention.

*¹○: always open, X: always close
*²Regulation gate to avoid the case that all the gates are closed at any spot of time (9) Result of Consideration In Table 2, (1) through (4) are for the conventional method where no open/close operation of valve gate is given during molding, and (5) is for the case that the gate at edge section of the product is selected as the regulation gate. FIG. 8 shows the gate open timing in the case of (5). As shown in FIG. 8, the gate 1 is closed from the start of injection to 5.6 seconds, and is opened from 5.6 seconds to the end of injection. The gate 2 is closed from the start of injection to 2.4 seconds, and is opened from 2.4 seconds to 4.5 seconds, then is closed from 4.5 seconds to the end of injection. The gate 3 is opened from the start of injection to 6.2 seconds, and is closed from 6.2 seconds to the end of injection. With the combination of open and close operations of gates as described above, the mold clamping force significantly decreases as shown in Table 2. More than 1000 tons of mold clamping force required without gate operation was reduced to less than 200 tons as a result.

(10) EXAMPLE 2

A description of one calculation example is given below for optimizing the open/close timing of injection molding product shown in FIG. 1 using the above-described simulation model and method for the case that the molding is conducted using the material AH561, a low flow resin (MFR=3) shown in Table 1. The molding conditions are resin temperature, hot runner temperature, and mold temperature of 220° C., 220° C., and 50° C., respectively, with the injection time of about 6 seconds. As for the design variables, the initial condition determined in Step 4 is the same as that of Example 1 except for dta=6, and the constraint condition applied in Step 9 is the same as that of Example 1 except that the upper limit of ta1, tb1, tc1, dta, dtb, dtc is selected as 6 (seconds). As a comparative example, calculations were carried out for the material AH561 without gate open/close control (always open), under the temperature conditions where the resin temperature, the hot runner temperature, and the mold temperature are 220° C., 220° C., and 50° C., respectively, or alternatively where those are 240° C., 240° C., and 50° C., respectively. Furthermore, for the material AZ564 in Table 1 (a high flow resin, MFR=30), calculations were carried out without gate open/close control (always open), under the temperature conditions that resin temperature, hot runner temperature, and mold temperature are 200° C., 200° C., and 50° C., respectively, and that those are 220° C., 220° C., and 50° C., respectively.

The results are summarized in Table 3.

TABLE 3

| Material | Mold clamping force without gate open/close control (all gates kept opened always) (ton) | | | Gate open/close Control*¹ | | | Mold clamping force with gate open/close control (ton) |
|---|---|---|---|---|---|---|---|
| | 200° C. | 220° C. | 240° C. | G1 | G2 | G3 | 220° C. |
| AZ564 (MFR = 30) | 1010 | 840 | | ○ | ○ | ○ | |
| AH561 (MFR = 3) | | 1630 | 1470 | ○ | ○ | ○ | |
| | | | | 3.4-end | 0.8-2.7 | 0-4.9 | 320 |

*¹○: always open

Table 3 contains comparative examples, which are the simulation results of conventional method without gate operation of the molding with AZ564 (a high flow resin) and AH561 (a low flow resin). According to the table, conventional method can mold a high flow resin at a mold clamping force of 1000 ton or smaller at a resin and hot runner temperatures of 220° C. For a low flow resin, however, the conventional method cannot mold the resin at a mold clamping force of 1000 ton or smaller even when the temperature of the resin and the hot runner is raised to 240° C. On the contrary, with the optimized valve gate operation, even a low flow resin can be molded at 220° C. under a mold clamping force of 500 ton or smaller. As a result, the low flow resin AH561 can be molded at a low cost using the same molding device with that for high flow resin. In some cases, depending on conditions, a thinner product can be produced by use of low flow resin instead of high flow resin.

As described above, according to the first embodiment, through the determination of production parameter which determines time-sequentially the inflow of resin material through the resin inflow conduit into the cavity using the combination of the numerical analysis method for calculating the injection molding process and the computer-aided optimization method, prompt and accurate calculation of parameter is attained without repeating manual trial and error. Accordingly, the first embodiment provides a method for determining production parameters of injection molding, which reduces the size of a molding device and reduces the production cost by controlling the maximum mold clamping force to a lower level even in arbitrary shape injection molding of a resin product.

[Second Embodiment]

Figure 9:
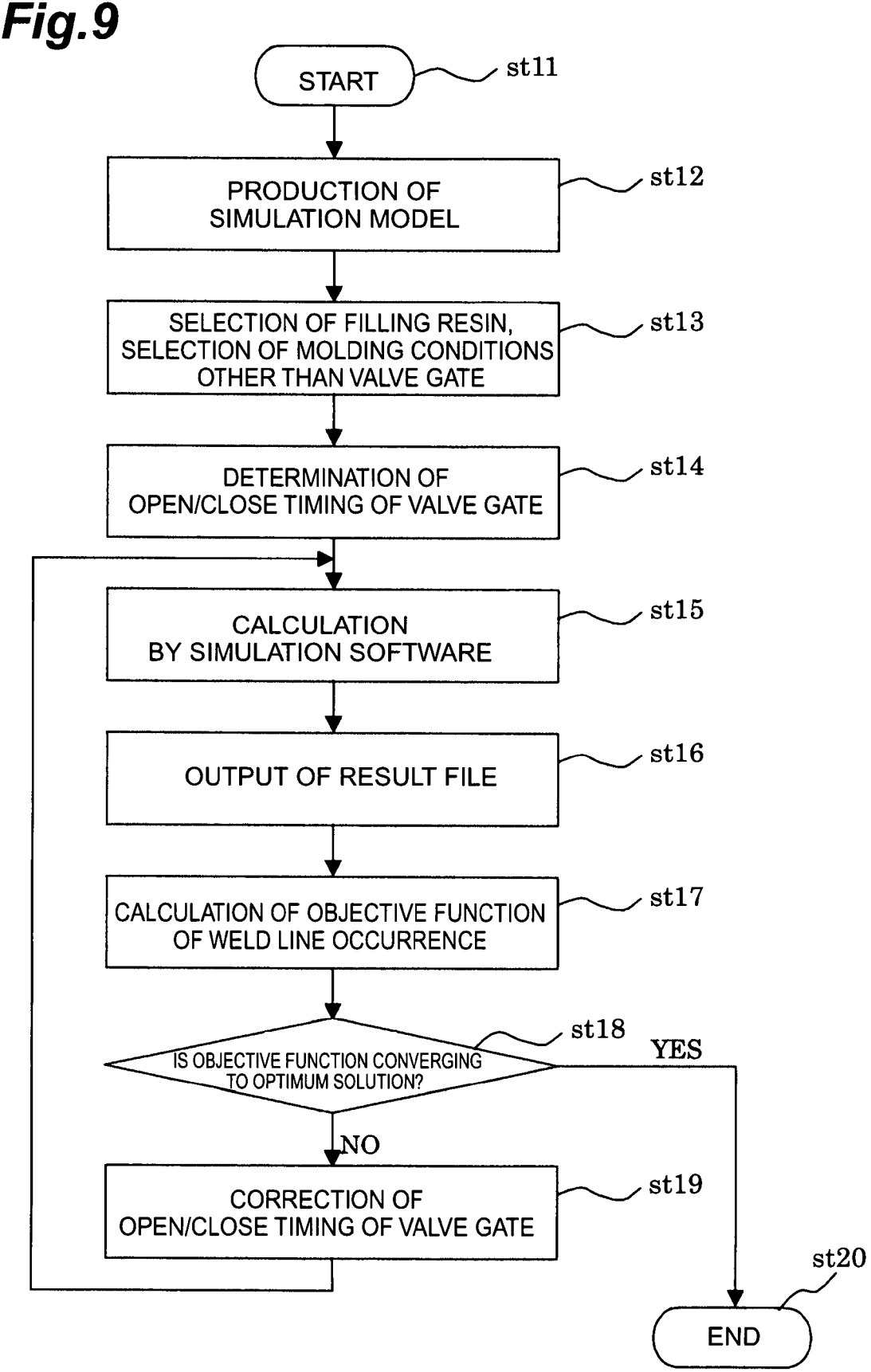
FIG. 9 shows a flow diagram to explain one embodiment according to the present invention.

According to the second embodiment, the open/close timing of the individual valve gates is determined so that weld lines are located at any convenient positions by the combination of the numerical analysis method for calculating the injection molding process and the computer-aided optimization method. Regarding the numerical analysis method to calculate the injection molding process, the method in which the behavior of resin is analyzed based on the finite element method using calculation equations on the basis of the relationship working between elements during molding, has been brought into practical application in recent years. The embodiment adopts Moldflow Plastics Insight 2.0 rev1 (trade name, produced by Moldflow Corporation). Many similar computer-aided optimization methods have been developed. The second embodiment adopts iSIGHT 6.0 (trade name, produced by Engineous Software Inc.) as software. Since the analysis deals with a problem with intense non-linearity, SA (simulated annealing) was adopted, which could explore the design space in global basis and was appreciated, therefore, as an easy-attainable global optimum, without a risk of ending in local optimum. The total flow scheme of the analysis is described below referring to the flow diagram of FIG. 9.

(1) Preparation of Simulation Model

Firstly, in Step 12, the simulation model for analyzing the resin flow during the injection molding process is produced. In the embodiment, a wide and flat plate model specified below is used.

Dimensions: 1600 mm in width, 300 mm in length, and 3 mm in thickness

Number of elements: 2862, Number of nodes: 1558, Three gates on one side

Runner diameter: 6 mm$\phi$ (Hot runner)

Gate: 4 mm$\phi$×7.5 mm L (Valve gate)

(2) Determination of Molding Condition

In Step 13, the conditions for injection molding are determined. It is firstly necessary to enter the data such as physical properties of the resin selected as the material. The resin applied here is Sumitomo Noblen NP156 (trade name, a polypropylene-base resin produced by Sumitomo Chemical Co. Ltd., staple fiber GFPP, GF 30 wt %). The necessary physical properties include thermal conductivity, specific heat, no-flow temperature, and viscosity. For further molding conditions, resin temperature, hot runner temperature, and mold temperature were set to 230° C., 230° C., and 50° C., respectively, injection speed was set constant and injection period was set about 8 seconds.

(3) Computer-Aided Optimization Stage

The stages of Step 14 and onwards are the computer-aided optimizing stages. That is, in Step 14, the initial value of the required parameter (which is called design variables: the open/close timing of the valve gate in this case) is determined. In Step 15, the resin inflow process is calculated. In Step 16, the result file is output. In Step 17, the objective function relating to weld line occurrence is calculated based on the result file. In Step 18, whether the calculated value is converging to an optimum solution, is evaluated. If not, in Step 19 the design variable is corrected based on the algorithm of the optimization method and Step 15 through Step 19 are repeated. If Step 18 determines that the objective function converges to the optimum solution, the optimization stage is completed.

Simulated annealing is adopted in the embodiment as the algorithm of the optimization method. In metal annealing, slow cooling of metals settles the individual molecules energy in high level to a low level. The simulated annealing adopts this as a model. That is, the simulated annealing is not a method to explore the optimum solution quickly but a method allowing global exploration by generating a variety of solutions while allowing local degradation of solution. The convergence to the optimum solution is to be judged after specified iterations of calculations.

(4) Constraint Condition Impartation on Determining Open/Close Timing

This embodiment adopts three valve gates. The open/close timing may be assumed to establish independently for each individual valve gate. In some cases, however, these valve gates cannot be manipulated independently because of the limitations in actual operation. The optimization is more efficiently conducted under further restricted conditions. To this point, the following constraint conditions were adopted.

Firstly, in this embodiment, the opening degree of each valve gate is not regulated continuously or stepwise, but only two positions of open and close are adopted considering the practical applicability. Since the resin does not solidify in the hot runner, each valve gate can wait in a closed state even after starting the injection molding, and can begin an opening action at any time afterwards. Also, a valve gate which was opened once to allow resin to pass through can be closed. If, however, a valve gate which was once opened followed by closing is again opened, the resin in the downstream side of the valve gate may solidify, depending on the period of a closed state, and the product may have molding defects such as determination in appearance. As a result, favorable operation patterns for a single valve gate are the following five patterns: (1) always open, (2) always close, (3) close→open, (4) open→close, and (5) close→open→close. This variation is defined as constraint condition 1a. As a simpler constraint condition, a variation which does not use the [open→close] pattern is conceivable. That is, a variation including the three patterns of (1) always open, (2) always close, (3) close→open is defined as constraint condition 1b.

On actual molding, when all the gates are simultaneously closed, runners and valve gates should be subjected to abnormally high pressure, and analysis likely induces error owing to the nature of software. For the countermeasures against this, it was defined as constraint condition 2a that at least one gate was kept opened during the molding process. As a simpler constraint condition, it is adoptable to keep one specific gate opened always, which was defined as constraint condition 2b.

(5) Determination of Open/Close Timing as a Design Variable

With the combination of either of the constraint condition 1a and 1b and either of the constraint condition 2a and 2b, various constraint conditions for the valve gate actions are obtained. Here, the simplest combination of 1b and 2b was adopted. That is, one gate is selected among the three gates as a regulation gate, which is kept always opened, then the other two gates are selected as arbitrary control gates. The optimization is conducted using the timing to keep these arbitrary control gates open as the independent variable. This embodiment comprises both the case that the gate G1 is always opened and the case that the gate G2 is always opened.

(6) Objective Function

This embodiment adopts [(weld line occurrence+mold clamping force necessary for molding)] as the objective function. If solely the weld line occurrence is evaluated, many optimum solutions are obtained. Therefore, the reduction in mold clamping force is added as an auxiliary objective function. Reduction in the mold clamping force leads to the reduction in size of a device, energy saving, and protection of a mold, thus reducing cost. Description about these items is given below.

(6-1) Evaluation on Weld Line Occurrence (1) Weld Line Judgment

The flow front joining angle is calculated at each node of a simulation model. The judgment is made on the calculated result.

(2) Weld Line Detection in a Specified Area

Figure 10:
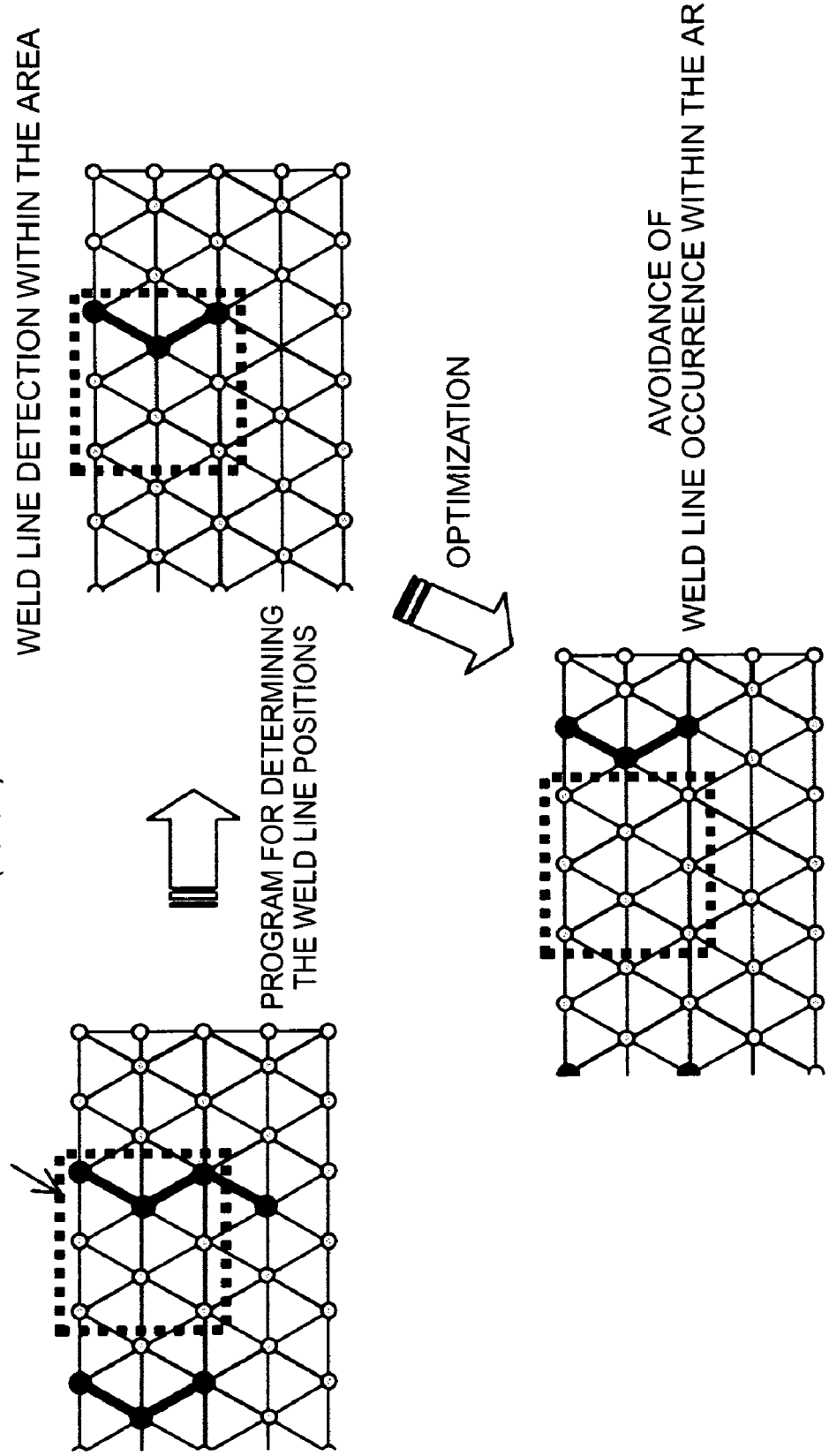
FIG. 10 shows a diagram to explain a method of controlling welding in one embodiment according to the present invention.
Figure 11:
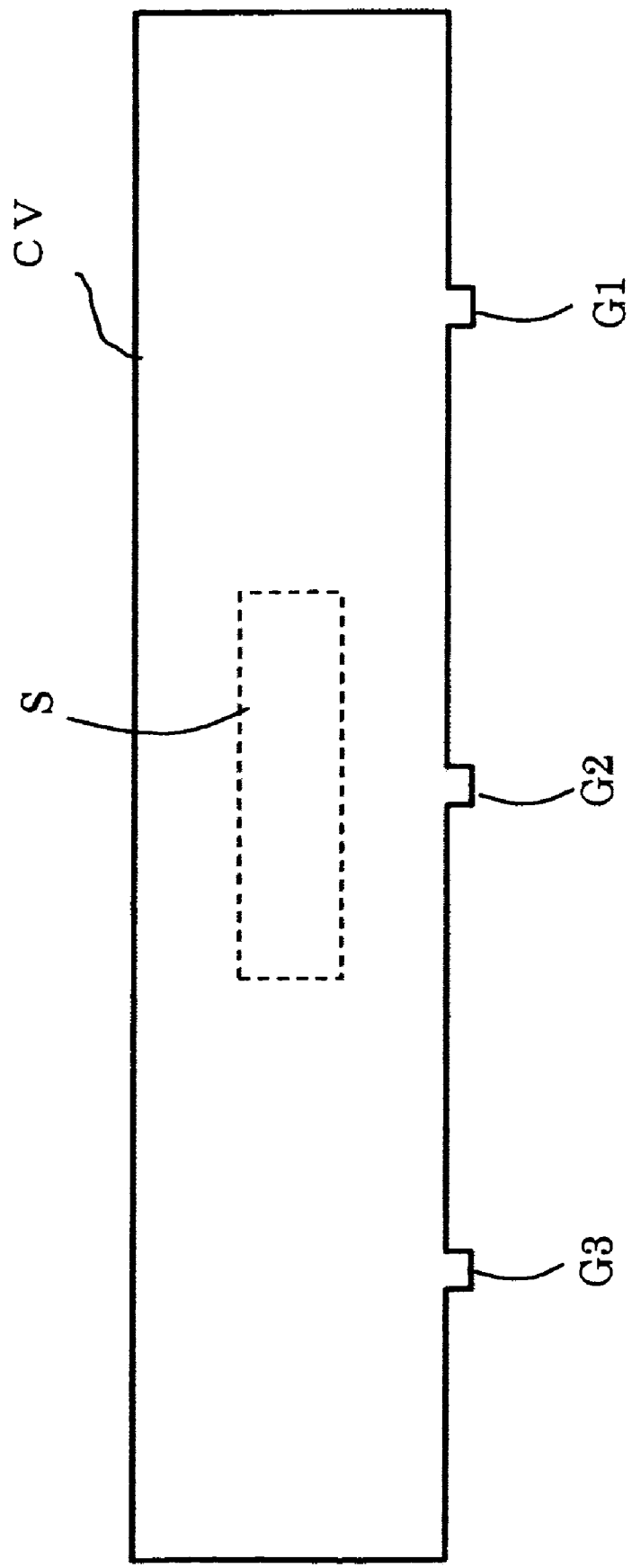
FIG. 11 shows a diagram to explain a method of controlling welding in one embodiment according to the present invention.

For some molding products, the avoidance of weld line occurrence is requested only in a specified area, (by shifting the weld line to other area). To cope with the requirement, a program for detecting weld only in a specified area was prepared (Refer to FIG. 10). As shown in FIG. 11, the program counts the weld line occurrence points only in a predetermined area S (a rectangular area having the same center and the same longitudinal direction as those of the product, the area being a portion of 400 mm in width and 100 mm in length at the center of the product), and outputs the count to a file. As for determination of a specific area, a polygonal area, for example, may be defined by an inequality or the like using coordinates. An arbitrarily shaped area can be defined by a method to memorize the nodes in the area.

(6-2) Mold Clamping Force Required for Molding

The mold clamping force is obtained by multiplying the resin pressure in the cavity calculated using a simulation model by the projected area.

(6-3) Final Objective Function

The objective function is given by [Objective function=A×$\delta$+B], where A is the number of weld lines formed (number of nodes) within a specified area, B (ton) is the mold clamping force required for molding, and $\delta$ is the weighting factor. In the case of attaching importance to weld line occurrence, the value of $\delta$ should be increased. According to this embodiment, $\delta$=1000 is adopted to give priority to the prevention of weld line occurrence. Although the weld line evaluation becomes simple if the above-described number of generated nodes is used, it is preferable that, when the intervals of nodes in the simulation model are uneven, the number of nodes be converted to the weld line length. When the weld line strength is also used for evaluation, if the temperature and the pressure of merging resin is additionally considered, more accurate result is obtained.

(7) Calculation Example for Optimization of Open/Close Timing

The open/close timing on injection molding of the product shown in FIG. 1 was optimized applying the following initial conditions and constraint conditions. Hereinafter t1, t2, and t3 are referred to as the open timing of gate G1, gate G2, and gate G3, respectively, with zero for the start of injection.

(Condition A)

The gate G1 is always kept open, and the gates G2 and G3 are in varied open timing.
Constraint condition: $10.0\,s \geq t2 \geq 0s$,
$10.0s \geq t3 \geq 0s$
Initial condition: t2=5.0 s, t3=5.0s (Condition B)

The gate G2 is always kept open, and the gates G1 and G3 are in varied open timing.
Constraint condition: $10.0\,s \geq t1 \geq 0s$,
$10.0s \geq t3 \geq 0s$
Initial condition: t1=5.0s, t3=5.0s The results are given in Tables 4 and 5.

TABLE 4

| Condition | Optimum gate open timing*[1] (Flow front arrival time) [s] | | | Number of weld line formed (Number of Nodes) | | Mold clamping force | Remarks |
| --- | --- | --- | --- | --- | --- | --- | --- |
| | Gate 1 | Gate 2 | Gate 3 | Whole area (1600 W × 300 L) | Area S (400 W × 100 L) | [ton] | |
| (1) | ○ | X | X | 0 | 0 | 2540 | One-point gate |
| (2) | ○ | Δ (4.7) | Δ (6.7) | 0 | 0 | 1660 | Cascade control |
| (3) | ○ | X | ○ | 18 | 6 | 1010 | Two-point gate |
| A | ○ | 0.7 | 4.0 | 14 | 0 | 1100 | Result of valve control optimization |

*[1] ○: always open, X: always close, Δ: open after flow front arrival (cascade control)

TABLE 5

| Condition | Optimum gate open timing*[1] (Flow front arrival time) [s] | | | Number of weld line formed (Number of Nodes) | | Mold clamping force | Remarks |
| --- | --- | --- | --- | --- | --- | --- | --- |
| | Gate 1 | Gate 2 | Gate 3 | Whole area (1600 W × 300 L) | Area S (400 W × 100 L) | [ton] | |
| (4) | X | ○ | X | 0 | 0 | 1310 | One-point gate |
| (5) | Δ (5.3) | ○ | Δ (5.3) | 0 | 0 | 1160 | Cascade control |
| (6) | ○ | ○ | ○ | 18 | 0 | 1140 | Three-point gate |
| B | 4.5 | ○ | 3.1 | 10 | 0 | 1130 | Result of valve control optimization |

*[1] ○: always open, X: always close, Δ: open after flow front arrival (cascade control)

(8) Result of Consideration

In Tables 4 and 5, (1) through (6) are for the conventional method, in which (1) and (4) are for the one-point gate, (2) and (5) are so-called "cascade control", in which when the resin which entered through the gate which was opened first reaches another gate, the gate is opend, (3) is for two-point gate (always open), and (6) is for the three-point gate (always open). As shown in Tables 4 and 5, the second embodiment allows the mold clamping force to keep at a lower level while suppressing the weld line occurrence in a specified area only by operating the gate open timing, thus the second embodiment provides a practical molding method responding to the usage purpose of molding products.

In the above embodiment, only a single area is targeted for suppressing the weld line occurrence. However, the case of dispersed areas can be treated in a similar manner by structuring the objective function as the sum of individual number of generated weld line. Furthermore, the weighted sum in each area can deal with the plurality of areas having different degrees of importance degrees. As described above, the weld line generating positions can be more finely controlled through the control of weld line occurrence at individual areas.

Figure 12:
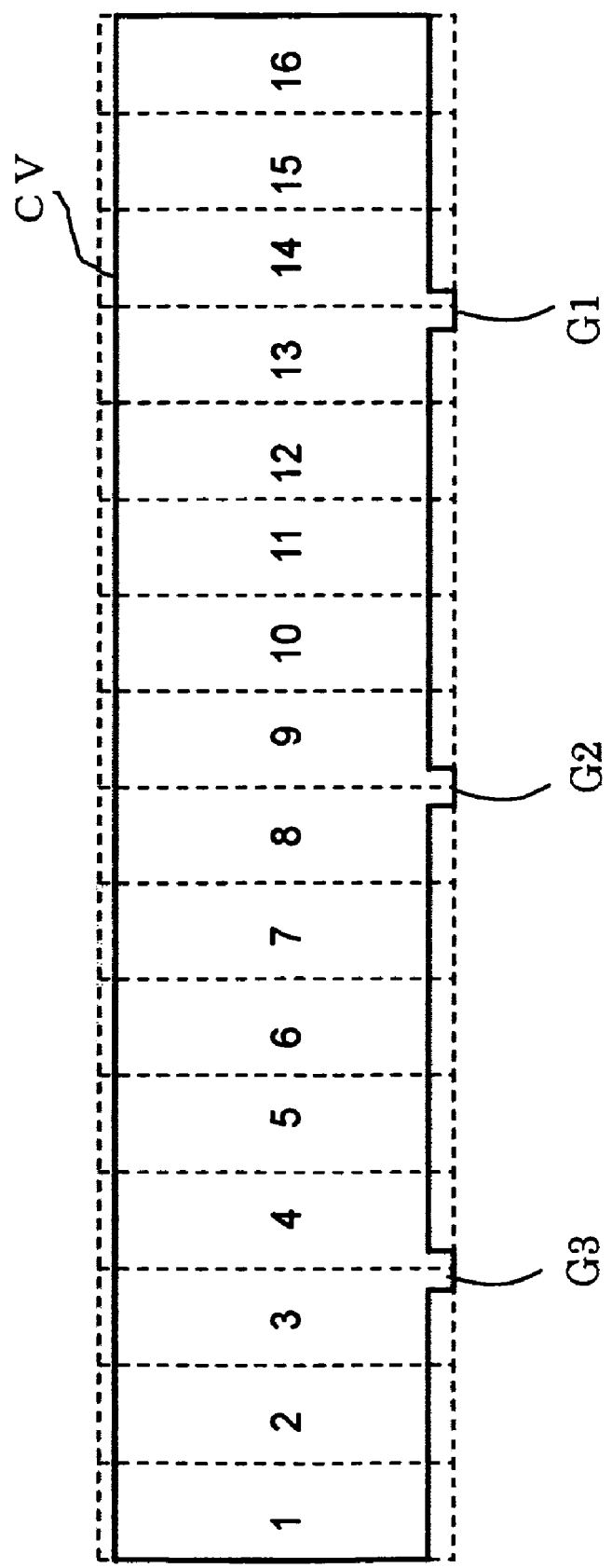
FIG. 12 shows a diagram to explain a method of controlling welding in another embodiment according to the present invention.

For example, the description given below is the case that a plate-shaped member shown in FIG. 1 is divided into sixteen areas in width direction thereof, as shown in FIG. 12, and that the weld lines are guided to the areas 5 and 11. To each area, a weighting factor As is applied depending on the degree of necessity for preventing the weld line occurrence or for inspiring the weld line occurrence. The weld line evaluation value is defined as the total sum of multiplying the number of generated weld lines detected in each area by the weighting factor.

Weld line evaluation value=$\Sigma As*Ws$ where, s is the area number (S=1~16), As is the weighting factor at each area, and Ws is the number of generated weld lines in each area (number of nodes).

For example, the weighting factor "1" is given to the desired area to have weld line occurrence, and the weighting factor "2500" is given to the area furthest from the above weld line occurrence area. The weighting factors ranging from 1 to 2500 are allotted stepwise between these areas, as shown below.

A5, A11 ... 1
A4, A6, A10, A12 ... 500
A3, A7, A9, A13 ... 1000
A2, A8, A14 ... 1500
A1, A15 ... 2000
A16 ... 2500

In that case, each weighting factor As includes the weighting element for the mold clamping force B (ton). Consequently, the objective function is given by:

Objective function=$\Sigma As*Ws+B$

With the definition, the number of generated weld lines in an area with large weighting factor As is evaluated as large, while the number thereof in an area with small weighting factor is evaluated as small. As a result, the weld line is guided to an area with small weighting factor As. The allotment of the weighting factors As may be determined depending on the situation.

The above-described concept that the evaluation value is determined by applying weighting factor to each area and by summing up thereof is applicable also to the case of evaluating the quantity of generated weld lines using the distance between successive nodes, not using the number of nodes.

Furthermore, adding to or substituting for the quantity of generated weld lines, the strength can also be evaluated adding the implication of such conditions as temperature and pressure or merging angle on merging resin.

Although in this embodiment the mold clamping force is adopted as an auxiliary objective function, other adequate parameters may be applied depending on the individual conditions. In this embodiment objective function is configured as the sum of plurality of elemental objective functions, other adequate equations may be applied depending on the individual conditions.

As described above, the second embodiment allows calculating the production parameters which determine time-sequentially the resin material inflow through the resin inflow conduit promptly and accurately without repeating manual trial and error. Accordingly, injection molding of resin products having arbitrary shapes is performed while suppressing or controlling the occurrence of weld lines. Furthermore, plurality of areas having different levels of importance can be dealt with through applying the objective function composed of sum of individual weighted areas, thus performing further fine control of weld line occurrence. In addition, the device cost and the working cost can be reduced by applying a mold clamping force required for molding as an auxiliary objective function.

What is claimed is:

1. A method for determining a production parameter of an injection molding, in an event of implementation of injection molding using a mold having a plurality of resin inflow conduits to cavity, by combination of a numerical analysis method for calculating injection molding process and a computer-aided optimization method wherein said production parameter determines time-sequentially an inflow of resin material from resin inflow conduits into said cavity wherein said production parameter is determined in order to control a mold clamping force required for injection molding, wherein said production parameter is a parameter to control the action of valves gates positioned in a plurality of resin inflow conduits, wherein said production parameter is optimized under a condition that at least one of said valve gates is opened at any spot of time during a filling stage; and wherein target areas for controlling weld line occurrence are divided into a plurality of areas, the quantity of weld line occurrence in each area is weighted, the weighted quantity of weld line occurrence is summed to obtain a weld line evaluation value, and the weld line evaluation value thus obtained is used to induce said weld line occurrence to a specified area or to avoid said weld line occurrence from a specified area.

2. The method for determining a production parameter of an injection molding according to claim 1, wherein said valve gate is located at each of a plurality of resin inflow conduits, one valve gate is selected as a timing regulation gate, while actions of other gates are arbitrarily determined, and the action of said timing regulation gate is constrained so that at least one valve gate is opened at any spot of time.

3. The method for determining a production parameter of an injection molding according to claim 1, wherein said production parameter is determined in order to control weld line occurrences.

4. The method for determining a production parameter of an injection molding according to claim 3, wherein said control of weld line occurrence is a control of positions of occurrence.

5. The method for determining a production parameter of an injection molding according to claim 3, wherein a state of weld line occurrence in a specified area of said molding is evaluated when determining said production parameter.

6. The method for determining a production parameter of an injection molding according to claim 3, wherein determination of said production parameter is conducted by adopting auxiliary objects adding to said control of weld line occurrence.

7. A method for producing an injection molding, comprising the steps of: in an event of conducting injection molding using a mold having a plurality of resin inflow conduits to a cavity,
  (1) determining a production parameter by combination of a numerical analysis method for calculating injection molding process and a computer-aided optimization method,
  wherein said production parameter determines time-sequentially an inflow of resin material from said resin inflow conduits into said cavity,
  wherein said production parameter is determined in order to control a mold clamping force required for injection molding,
  wherein said production parameter is a parameter to control the action of valves gates positioned in a plurality of resin inflow conduits, and wherein said production parameter is optimized under a condition that at least one of said valve gates is opened at any spot of time during a filling stage; and
  (2) conducting injection molding on the basis of the thus determined production parameter while controlling time-sequentially said inflow of resin material from said resin inflow conduit; and
  wherein target areas for controlling weld line occurrence are divided into a plurality of areas, the quantity of weld line occurrence in each area is weighted, the weighted quantity of weld line occurrence is summed to obtain a weld line evaluation value, and the weld line evaluation value thus obtained is used to induce said weld line occurrence to a specified area or to avoid said weld line occurrence from a specified area.

8. An injection molding device comprising:
  (1) a molding device main body which feeds resin material to a mold having a plurality of resin inflow conduits to a cavity through the resin inflow conduits;
  (2) a memory section which memorizes production parameters determined by combination of a numerical analysis method for calculating injection molding process and a computer-aided optimization methods,
  wherein said production parameter is determined in order to control a mold clamping force required for injection molding,
  wherein said production parameter is a parameter to control the action of valves gates positioned in a plurality of resin inflow conduits, and
  wherein said production parameter is optimized under a condition that at least one of said valve gates is opened at any spot of time during a filling stage;-and
  (3) a control section which carries out injection molding while controlling said molding device main body on the basis of production parameters the thus determined and controlling time-sequentially said inflow of said resin material from said resin inflow conduits; and
  wherein target areas for controlling weld line occurrence are divided into a plurality of areas, the quantity of weld line occurrence in each area is weighted, the weighted quantity of weld line occurrence is summed to obtain a weld line evaluation value, and the weld line evaluation value thus obtained is used to induce said weld line occurrence to a specified area or to avoid said weld line occurrence from a specified area.

9. A computer readable medium having stored thereon instructions for enabling a computer to execute a process for determining production parameters, in the course of carrying out injection molding using a mold having a plurality of resin inflow conduits to a cavity, by combination of a numerical analysis method for calculating injection molding process and a computer-aided optimization method, wherein said production parameters determine time-sequentially the inflow of said resin material from said resin inflow conduits into said cavity,
  wherein said production parameter is determined in order to control a mold clamping force required for injection molding,
  wherein said production parameter is a parameter to control the action of valves gates positioned in a plurality of resin inflow conduits,
  wherein said production parameter is optimized under a condition that at least one of said valve gates is opened at any spot of time during a filling stage; and
  wherein target areas for controlling weld line occurrence are divided into a plurality of areas, the quantity of weld line occurrence in each area is weighted, the weighted quantity of weld line occurrence is summed to obtain a weld line evaluation value, and the weld line evaluation value thus obtained is used to induce said weld line occurrence to a specified area or to avoid said weld line occurrence from a specified area.

* * * * *